United States Patent [19]

Mueller et al.

[11] Patent Number: 4,960,462

[45] Date of Patent: Oct. 2, 1990

[54] ACICULAR, FERROMAGNETIC METAL PARTICLES ESSENTIALLY CONSISTING OF IRON, AND THEIR PREPARATION

[75] Inventors: Michael W. Mueller, Plankstadt; Kalus-Dieter Hoppe, Wachenheim; Ekkehard Schwab, Neustadt; Werner Steck, Ludwigshafen; Helmut Auweter, Limburgerhof; Rainer Feser, Gruenstadt, all of Fed. Rep. of Germany

[73] Assignee: BASF Aktiengesellschaft, Ludwigshafen, Fed. Rep. of Germany

[21] Appl. No.: 284,246

[22] Filed: Dec. 14, 1988

[51] Int. Cl.$^5$ ............................................. H01F 1/047
[52] U.S. Cl. ..................................... 75/252; 148/307; 148/310

[58] Field of Search ................... 75/251, 252; 148/105, 148/306, 307, 310; 428/900

[56] References Cited

U.S. PATENT DOCUMENTS 4,469,507  9/1984  Sekiguchi et al. .................. 148/105
4,481,253  11/1984  Matsufuji et al. ................... 428/900

*Primary Examiner*—Theodore Morris
*Assistant Examiner*—George Wyszomierski
*Attorney, Agent, or Firm*—Keil & Weinkauf

[57] ABSTRACT

Acicular, ferromagnetic metal particles which essentially consist of iron and have a nickel content of not more than 0.4% by weight and high values for coercive force and magnetization, and a process for the preparation of these particles. The particles further include zinc, phosphorus in the form of phosphate-ions, and silicon in the form of $SiO_2$.

1 Claim, No Drawings

ACICULAR, FERROMAGNETIC METAL PARTICLES ESSENTIALLY CONSISTING OF IRON, AND THEIR PREPARATION

The present invention relates to acicular, ferromagnetic metal particles essentially consisting of iron and a process for their preparation by reducing a shapestabilized acicular iron oxide with a gaseous reducing agent.

Iron particles having a high coercive force and intended for magnetic recording media are obtained, inter alia, by reducing finely divided, acicular iron oxide compounds, for example the oxides or oxide hydroxides, with hydrogen or other gaseous reducing agents. It is preferable to use Fe(III) oxide hydroxides, from which the corresponding iron particles are prepared by heating and reduction followed by passivation.

The good magnetic properties and in particular the high coercive force of acicular iron particles are essentially based, despite the cubic crystal lattice, on the shape anisotropy, i.e. the acicular shape of the particles is critical for the magnetic properties. To keep the loss of shape during the conversion of the acicular Fe(III) oxide hydroxides as small as possible and to avoid sintering, iron oxide hydroxide particles are provided with a shape-stabilizing coating prior to this conversion. However, correct adjustment of the geometry during the synthesis of FeOOH is of critical importance.

For example, $\alpha$-FeOOH can be synthesized by the acidic process. The starting material in this procedure is an aqueous Fe(II) salt solution, to which further ions may be added. As a result of the addition of these foreign ions, the geometry of the FeOOH particles can be influenced. At the beginning of the synthesis, some of the Fe(II) ions are precipitated with an alkali. This is followed by the oxidation, for example by passing in air, to give $\alpha$-FeOOH. The protons liberated during this procedure are first trapped by the Fe(II) hydroxide precipitate going into solution, so that the pH does not fall below 5. Once the Fe(II) hydroxide precipitate has completely dissolved, there is a sharp decrease in the pH and formation of $\alpha$-FeOOH virtually completely stops. This first part of the FeOOH synthesis is referred to as the nucleation phase. The Fe(II) ions still in solution are then oxidized with an oxidizing agent, i.e. air, with simultaneous continuous addition of an alkali to give $\alpha$-FeOOH, which grows on the existing nuclei (growth phase). After the end of the synthesis, the $\alpha$-FeOOH is provided with a shape-stabilizing coating. The use of phosphates (US-A 4 305 753), phosphates and borates (DE-A 27 43 298), phosphates and zinc (DE-A 36 03 431 corresponds to allows U.S. Appln. Ser. No. 07/011,127 filed Feb. 5, 1987), alkaline earth metal compounds in conjunction with carboxylic acids (DE-A 24 34 096) or tin compounds (DE-C 19 07 691) and compounds of silicon and/or of aluminum (EP-A 56 257, DE-A 30 44 772 and US-A 41 33 677) has already been proposed for this purpose. The dehydration and/or heating of the $\alpha$-FeOOH has also been described (EP-A 24 692, EP-A 24 694, EP-A 56 257, US-A 37 02 270, etc.). Reduction of the resulting iron oxide particles to the metal is usually carried out using a gaseous reducing agent, generally hydrogen (US-A 2 879 154).

Temperatures of up to 500° C. are required to reduce these oxide materials. This temperature must furthermore be maintained for a few hours in order to effect substantially complete conversion of the oxide into the metal. As a result, however, the acicular particles undergo sintering, so that the required magnetic properties of the resulting metal particles are not obtained. It has therefore been proposed (DE-A 22 12 933) to incorporate into the iron oxide particles metals which act as a catalyst for hydrogen reactions, in order thus to reduce both the temperature and the duration of the reduction. Particularly for the preparation of metal particles having a high coercive force, in particular iron particles having coercive forces greater than 100 kA/m and a magnetization of more than 120 nTm$^3$/g, it has proven advantageous to incorporate nickel compounds into the iron oxide materials to be reduced. The reduction facilitated by the catalyst effect of the nickel, and therefore particularly mild, makes it possible to obtain the magnetic properties of the metal particles consisting predominantly of iron, the said magnetic properties being required for the desired high recording density in magnetic recording media. However, the disadvantage of this procedure is that nickel is among the substances which pollute the environment and the workplace.

It is an object of the present invention to provide acicular, ferromagnetic metal particles essentially consisting of iron and a process for their preparation which does not have the stated disadvantages and nevertheless possesses the required high values for coercive force and magnetization.

We have found that this object is achieved by acicular, ferromagnetic metal particles essentially consisting of iron, which do not contain more than 0.4% by weight, based on the total amount of the metal particles, of nickel, and at the same time have a coercive force greater than 100 kA/m and a magnetization greater than 120 nTm$^3$/g.

The present invention relates in particular to acicular, ferromagnetic metal particles essentially consisting of iron, which have the stated properties and, in addition to iron and oxygen, also contain by weight based on the amount of ferromagnetic metal, 0.15 to 6.15% zinc, phosphorus and 1.54 to 6.76% silicon as well as less than 0.1% by weight, based on the total amount of the metal particles, of nickel. The phosphorus may be present in the form of phosphorus ions, and silicon may be present in the form of $SiO_2$.

The present invention furthermore relates to a process for the preparation of the said metal particles, which comprises (1) precipitating from 30 to 70% of the iron(II) ions as iron(III) oxide hydroxide nuclei from an aqueous iron(II) sulfate solution by adding an aqueous alkali metal hydroxide solution and passing an oxygen-containing gas through the solution, (2) then precipitating the remaining iron(II) ions still in solution onto the $\alpha$-FeOOH nuclei while uniformly passing through the oxygen-containing gas at a pH of from 4.0 to 6.0, which is kept constant by adding an alkali metal hydroxide, and while mixing a silicate-containing solution with the alkali metal hydroxide solution in an amount of from 0.4 to 1.8% by weight, calculated as $SiO_2$ and based on the amount of resulting FeOOH, (3) then adding a further silicate-containing solution in an amount of from 0.6 to 2.6% by weight, calculated as $SiO_2$ and based on the amount of resulting FeOOH while keeping the pH constant: and (4) finally heating this $\alpha$-FeOOH at from 500 to 850° C. for from 30 to 300 minutes and reducing the resulting material to the metal with a gaseous reducing agent at from 200° to 450° C.

In an advantageous embodiment of the novel process, the pH of the α-FeOOH suspension is brought to greater than 7.0, preferably from 8.0 to 9.0, before the addition of the silicate-containing solution in stage 3 of the process and, after the end of the addition, the pH is reduced to below 7.0, preferably from 4 to 6.

In carrying out the novel process, it is important that the iron(II) sulfate solution used is nickel-free or is only very slightly contaminated with nickel, i.e. contains less than 0.1%, based on the iron sulfate, of nickel. This also applies to the other materials used in the process, in particular to the silicate-containing solutions, as well as to any amounts of phosphates and zinc salts added in the known manner.

This treatment is followed by the dehydration and then the heating of the filtered off, washed and dried α-FeOOH at from 500° to 850° C. for from 30 to 300 minutes. The iron oxide particles obtained in the heating step are then reduced with a gaseous reducing agent, e.g. hydrogen, at from 200° to 450° C. to give the metal. Finally, this finely divided metal powder is advantageously passivated by controlled oxidation of the surface to facilitate handling.

The novel metal particles have the required properties; in particular, dispensing with nickel ions surprisingly results in a sharp increase in the saturation magnetization. The said particles can be particularly advantageously obtained by the process of the invention. Because of their advantageous magnetic characteristics, these materials are very suitable as magnetic material for magnetic recording media, in particular for all information storage media which require a high storage density. The storage media are produced in a conventional manner. For this purpose, the metal powder together with the conventional additives, i.e. dispersants, such as sodium oleate, zinc oleate or sodium laurate, palmitate or stearate, and, if required, nonmagnetic fillers, such as powdered quartz, silicate-based powders, alumina or zirconium oxide, and the binders dissolved in organic solvents, for example elastomeric polyurethanes, epoxy resins, vinyl chloride copolymers, vinyl acetate copolymers, isocyanate-crosslinked, OH-containing polyurethanes and mixtures of these, are converted into a dispersion in a dispersing apparatus, such as a tubular mill or a stirred ball mill. The magnetic dispersion is then applied to the nonmagnetic base with the aid of a conventional coating apparatus. Suitable nonmagnetic bases are the conventional bases, in particular films of linear polyesters, such as polyethylene terephthalate, in general in thicknesses of from 4 to 20 μm. Before the still liquid coating mixture is dried on the base, the anisotropic magnetic particles are oriented along the intended recording direction by the action of a magnetic field. Thereafter, the magnetic layers are calendered and compacted by being passed between heated and polished rollers. The thickness of the magnetic layer is in general from 2 to 10 μm.

The Examples which follow illustrate the invention. The metal particles were characterized by determining the specific surface area $S_{N2}$ in [m$^2$/g], measured by the BET method according to DIN 66,132 with the aid of a Ströhlein areameter from Ströhlein, Düsseldorf, FRG, using the one-point difference method according to Haul and Dümbgen, and the magnetic properties. These were measured, following biassing, in a discharge capacitor in a magnetic field of 160 or 380 kA/m, the relevant properties being the coercive force $H_c$ in [kA/m] at a tap density of 1.6 g/cm$^3$ and the specific remanence $M_{r/\delta}$ and the magnetization $M_{m/\delta}$ in [nTm$^3$/g].

The switching field distribution SFD was also measured in accordance with Williams and Comstock (AIP Conf. Proc. 5 (1971), 738).

EXAMPLE 1

In a 10 l glass vessel equipped with a stirrer, a temperature and pH regulation apparatus and gas inlet apparatus for nitrogen and air, 5.5 l of water were acidified with 3.2 ml of concentrated H$_2$SO$_4$ and 1222 g of chemically pure FeSO$_4$ . 7H$_2$O were dissolved therein, while passing through nitrogen. In addition, 12.8 g of ZnSO$_4$ . 7H$_2$O and 1.1 g of NaH$_2$PO$_4$ . 2H$_2$O were dissolved in this solution. The reaction mixture was thermostated at 40° C. Thereafter, 1010 ml of a 15% strength by weight NaOH solution, corresponding to a degree of precipitation of 50% of Fe(II), were pumped in by means of a tube pump. The gas feed was changed to 400 l/h of air and nucleation was effected at 40° C. until the pH had decreased to below 4.0.

5.1 g of NaH$_2$PO$_4$ . 2H$_2$O were then added to the reaction mixture, after which the growth process was carried out at a pH of 5.5. 35 g of waterglass (26% strength by weight solution) were metered into the NaOH required in this process. When the growth phase had ended, a further 27 g of waterglass in 200 ml of H$_2$O were pumped in. The pH was kept at 5.5 during this procedure. The α-FeOOH suspension was filtered off over a suction pump and washed. The filter cake was dried at 110° C. in a drying oven under reduced pressure.

The α-FeOOH obtained was heated in a stream of nitrogen at 800° C. for 90 minutes in a rotating flask and then reduced with hydrogen in a rotating tube at 450° C. in the course of 8 hours to give the metal powder, which was finally passivated with a nitrogen/air mixture.

The magnetic material obtained in this manner had the following properties: (magnetic field 160 kA/m):

| BET surface area: | 47 |
|---|---|
| $H_c$: | 107 |
| $M_{r/\rho}$: | 85.6 |
| $M_{m/\rho}$: | 120 |
| SFD: | 0.48 |

The procedure described in Example 1 was followed, except that the amount of air introduced in the growth phase was reduced from 400 l/h to 200 l/h.

The results of the measurements were as follows (magnetic field 380 kA/m):

| BET surface area: | 43.2 |
|---|---|
| $H_c$: | 102.3 |
| $M_{r/\rho}$: | 84.5 |
| $M_{m/\rho}$: | 149.2 |
| SFD: | 0.51 |

EXAMPLE 3

The procedure described in Example 2 was followed, except that the heating temperature was reduced to 750° C.

The results of the measurements were as follows (magnetic field 380 kA/m):

| BET surface area: | 44.3 |
|---|---|
| $H_c$: | 104.3 |
| $M_{r/\rho}$: | 85 |
| $M_{m/\rho}$: | 147 |
| SFD: | 0.47 |

EXAMPLE 4

The procedure described in Example 2 was followed, except that the reduction temperature was decreased to 410° C.

The results of the measurements were as follows (magnetic field 380 kA/m):

| BET surface area: | 43.7 |
|---|---|
| $H_c$: | 102.5 |
| $M_{r/\rho}$: | 76.1 |
| $M_{m/\rho}$: | 131.9 |
| SFD: | 0.50 |

EXAMPLE 5

The procedure described in Example 1 was followed, except that the amount of gas introduced in the growth phase was reduced from 400 to 100 l/h.

The results of the measurements were as follows (magnetic field 380 kA/m):

| BET surface area: | 42.7 |
|---|---|
| $H_c$: | 101 |
| $M_{r/\rho}$: | 80.4 |
| $M_{m/\rho}$: | 146.7 |
| SFD: | 0.53 |

EXAMPLE 6

The procedure described in Example 1 was followed, except that the amount of gas introduced in the growth phase was reduced from 400 to 50 l/h.

The results of the measurements were as follows (magnetic field 380 kA/m):

| BET surface area: | 43.9 |
|---|---|
| $H_c$: | 100.5 |
| $M_{r/\rho}$: | 87.2 |
| $M_{m/\rho}$: | 155.6 |
| SFD: | 0.56 |

EXAMPLE 7

The procedure described in Example 1 was followed, except that the pH after the growth phase was changed from 5.5 to 4.0.

The results of the measurements were as follows (magnetic field 380 kA/m):

| BET surface area: | 42.6 |
|---|---|
| $H_c$: | 100.3 |
| $M_{r/\rho}$: | 85.9 |
| $M_{m/\rho}$: | 151.3 |
| SFD: | 0.55 |

EXAMPLE 8

The procedure described in Example 1 was followed, except that, when the growth phase was complete, the pH was brought to 9 with NaOH, after which 27 g of waterglass in 200 ml of water were pumped in, stirring was continued, the pH was brought to 6 with dilute $H_2SO_4$ and stirring was carried out again for some time. The mixture was heated at 800° C. and reduction was carried out with hydrogen at 410° C.

The results of the measurements were as follows (magnetic field 160 kA/m):

| BET surface area: | 48.4 |
|---|---|
| $H_c$: | 108.3 |
| $M_{r/\rho}$: | 75.0 |
| $M_{m/\rho}$: | 128.3 |
| SFD: | 0.51 |

EXAMPLE 9

The procedure described in Example 8 was followed, except that the reduction temperature was increased to 430° C.

The results of the measurements were as follows (magnetic field 380 kA/m):

| BET surface area: | 49.8 |
|---|---|
| $H_c$: | 103 |
| $M_{r/\rho}$: | 78.3 |
| $M_{m/\rho}$: | 135.6 |
| SFD: | 0.57 |

EXAMPLE 10

In a 250 l kettle equipped with a stirrer, a temperature and pH regulating apparatus and a gas inlet apparatus for nitrogen and air, 108 l of water were acidified with 57 ml of concentrated $H_2SO_4$ and 22 kg of chemically pure $FeSO_4 \cdot 7H_2O$ were dissolved therein, while passing through nitrogen. In addition, 230 g of $ZnSO_4 \cdot 7H_2O$ and 20 g of $NaH_2PO_4 \cdot 2H_2O$ were added to this solution and dissolved. The reaction solution was thermostated at 40° C. Thereafter, 18 l of a 15% strength by weight NaOH solution, corresponding to a degree of precipitation of 50% of Fe(II), were pumped in by means of a pump. The gas feed was changed to 3,700 l/h of air and nucleation was effected at 4° C. until the pH had fallen below 4.0. 120 g of $NaH_2PO_4 \cdot 2H_2O$ were added to the reaction mixture, after which the growth process was carried out at a pH of 5.5. During the entire growth phase, a solution of 630 g of waterglass and 3 l of $H_2O$ was added. After the end of the growth phase, the pH was brought to 9.0 with 15% strength NaOH, and 486 g of waterglass in 2 l of water were added. Stirring was continued for some time, after which the pH was brought to 6 with dilute $H_2SO_4$ and stirring was again carried out for some time. The α-FeOOH suspension was filtered over a filter press, the residue was washed and the filter cake was dried in a drying oven at 110° C. under reduced pressure.

The α-FeOOH obtained was heated in a rotary furnace at 780° C. for a residence time of 90 minutes and then reduced with hydrogen in the rotary furnace at 410° C. for a residence time of 7 h to give the metal. Finally, the metal powder was passivated with a nitrogen/air mixture.

The magnetic material obtained in this manner had the following properties (magnetic field 160 kA/m):

| | |
|---|---|
| BET surface area: | 45 |
| $H_c$: | 109.0 |
| $M_{r/\rho}$: | 87.3 |
| $M_{m/\rho}$: | 123.0 |
| SFD: | 0.51 |

EXAMPLE 11

700 parts of an acicular iron powder according to Example 10, together with 91 parts of a spherical $Al_2O_3$ powder having a mean particle diameter of 0.6 μm, in 722.8 parts of a 13% strength solution of a thermoplastic polyesterurethane obtained from adipic acid, butane-1,4-diol and 4,4'-diisocyanatodiphenylmethane in a mixture of equal amounts of tetrahydrofuran and dioxane, 201.3 parts of a 20% strength solution of a phenoxy resin obtained from bisphenol A and epichlorohydrin, having a mean molecular weight of 30,000 and a hydroxyl content of 6%, in the abovementioned solvent mixture, and a further 264.1 parts of this solvent mixture were dispersed for 32 hours in a stirred ball mill having a capacity of 6,000 parts by volume and containing 2,330 parts of spheres of diameter 1–1.5 mm, with the addition of 3.5 parts of stearic acid and 55.4 parts of a dispersant based on a mixture of an oxyethylated monophosphate and the salt of an ethylhexyl sulfosuccinate. Thereafter, 23.7 parts of methyl stearate were added and dispersing was continued for a further 5 hours. When dispersing was complete, 46.7 parts of a 50% strength solution of a triisocyanate, prepared from 3 moles of toluylene diisocyanate and 1 mole of 1,1,1-trimethylolpropane, in ethyl acetate were added and stirring was continued for a further 15 minutes. The dispersion was filtered and then applied in the form of a 5 μm thick layer on a polyethylene terephthalate film, with simultaneous orientation of the magnetic particles by means of a permanent magnet. After drying, the magnetic layer was calendered by being passed between heated rollers under pressure (90° C., nip pressure 200 kg/cm), and the coated film web was slit into 1/2 inch wide tapes.

The magnetic properties were measured in a magnetic field of 380 kA/m. The video properties were determined in comparison with a commercial reference tape (Sony MP, 0 dB) on a loop drive. The results of the measurements are shown in the Table.

TABLE

| Luminance | | | Chrominance | |
|---|---|---|---|---|
| Signal [dB] | S/N [dB] | Modulation noise [dB] | Signal [dB] | S/N [dB] |
| −3.5 | −2.5 | +9.4 | −2.0 | −1.5 |

COMPARATIVE EXPERIMENT 1

The procedure described in Example 1 was followed, but with the following changes:

When the growth phase was complete, the pH was brought to 9 and was kept at this value for the entire time.

The α-FeOOH obtained was heated at 780° C. and reduced at 410° C.

The results of the measurements were as follows (magnetic field 160 kA/m):

| | |
|---|---|
| BET surface area: | 41.0 |
| $H_c$: | 88.3 |
| $M_{r/\rho}$: | 62.0 |
| $M_{m/\rho}$: | 96.0 |
| SFD: | 0.61 |

COMPARATIVE EXPERIMENT 2

The procedure described in Comparative Experiment 1 was followed, except that the heating temperature was reduced to 750° C.

The results of the measurements were as follows (magnetic field 160 kA/m):

| | |
|---|---|
| BET surface area: | 43.1 |
| $H_c$: | 86.0 |
| $M_{r/\rho}$: | 62.0 |
| $M_{m/\rho}$: | 98.0 |
| SFD: | 0.69 |

COMPARATIVE EXPERIMENT 3

The procedure described in Example 1 was followed, except that the total amount of $SiO_2$ was added after the end of the growth phase at pH 9.

The results of the measurements were as follows (magnetic field 380 kA/m):

| | |
|---|---|
| BET surface area: | 39 |
| $H_c$: | 90 |
| $M_{r/\rho}$: | 69 |
| $M_{m/\rho}$: | 105 |
| SFD: | 0.61 |

COMPARATIVE EXPERIMENT 4

The procedure described in Comparative Experiment 3 was followed, except that 110 g of $NiSO_4 \cdot 6H_2O$ in 300 ml of $H_2O$ were added. Furthermore, heating was carried out at 750° C. and reduction with hydrogen at 410° C.

The results of the measurements were as follows (magnetic field 160 kA/m):

| | |
|---|---|
| BET surface area: | 42.6 |
| $H_c$: | 105 |
| $M_{r/\rho}$: | 84.2 |
| $M_{m/\rho}$: | 117.0 |
| SFD: | 0.44 |

We claim:
1. Acicular, ferromagnetic metal particles having a coercive force greater than 100kA/m and a magnetization of not less than 120 $nTm^3/g$, measured in an external magnetic field of 160 kA/m, which particles consist essentially of iron; not more than 0.4% by weight, based on the total amount of the metal particles, of nickel; from 0.15 to 6.15% by weight, based on the amount of ferromagnetic metal, of zinc; from 0.17 to 10.76% by weight, based on the amount of ferromagnetic metal, of phosphorus in the form of phosphate ions; and from 1.54 to 6.76 by weight, based on the amount of ferromagnetic metal, of silicon in the form of $SiO_2$.

* * * * *

UNITED STATES PATENT AND TRADEMARK OFFICE
CERTIFICATE OF CORRECTION

PATENT NO. : 4,960,462

DATED : October 2, 1990

INVENTOR(S) : Michael MUELLER et al.

It is certified that error appears in the above-identified patent and that said Letters Patent is hereby corrected as shown below:

On the title page, please insert:

--[30]  Foreign Application Priority Data
    Dec. 18, 1987  [DE] Fed. Rep. of Germany.....3743039--

Signed and Sealed this

Seventh Day of January, 1992

Attest:

HARRY F. MANBECK, JR.

Attesting Officer     Commissioner of Patents and Trademarks